US012798266B2

(12) United States Patent
Onodera et al.

(10) Patent No.: US 12,798,266 B2
(45) Date of Patent: Nov. 17, 2026

(54) SUPPORTING STRUCTURE FOR TEMPERATURE SENSOR AND DRYING DEVICE

(71) Applicants: Ken Onodera, Kanagawa (JP); Yasuyuki Horie, Kanagawa (JP); Yoshitaka Akiyama, Kanagawa (JP); Kenji Maruoka, Kanagawa (JP); Hiroshi Kato, Tokyo (JP); Junichi Terai, Kanagawa (JP); Masaki Kitamura, Kanagawa (JP)

(72) Inventors: Ken Onodera, Kanagawa (JP); Yasuyuki Horie, Kanagawa (JP); Yoshitaka Akiyama, Kanagawa (JP); Kenji Maruoka, Kanagawa (JP); Hiroshi Kato, Tokyo (JP); Junichi Terai, Kanagawa (JP); Masaki Kitamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 655 days.

(21) Appl. No.: 18/203,174

(22) Filed: May 30, 2023

(65) Prior Publication Data

US 2023/0391107 A1 Dec. 7, 2023

(30) Foreign Application Priority Data

Jun. 3, 2022 (JP) ................................ 2022-090935

(51) Int. Cl.
*B41J 29/38* (2006.01)
*B41F 3/52* (2006.01)
(Continued)

(52) U.S. Cl.
CPC ........... *B41J 11/00242* (2021.01); *B41F 3/52* (2013.01); *B41F 23/042* (2013.01); *B41F 23/0476* (2013.01)

(58) Field of Classification Search
CPC ...... B41F 3/52; B41F 23/042; B41F 23/0476; B41J 11/00242
See application file for complete search history.

(56) References Cited

U.S. PATENT DOCUMENTS 5,275,684 A * 1/1994 Marazzi ................ B41F 19/062 156/359
5,528,345 A * 6/1996 Hasegawa .......... G03G 15/2064 399/122
(Continued)

FOREIGN PATENT DOCUMENTS

JP 6-289580 10/1994
JP 2001228742 A 8/2001
(Continued)

OTHER PUBLICATIONS

Japanese office action; Application JP2022090935; 2 pages; Apr. 30, 2026.

*Primary Examiner* — Lam S Nguyen
(74) *Attorney, Agent, or Firm* — Duft & Bornsen, PC

(57) ABSTRACT

A supporting structure for a temperature sensor, and a drying device provided with the supporting structure. The supporting structure includes a front panel, a rear panel, a first supporting member having both ends in a longer-side direction of the first supporting member, and a second supporting member attachable to and detachable from the first supporting member. In the supporting structure, both ends of the first supporting member are removably supported by the front panel and the rear panel. In the supporting structure, the temperature sensor is disposed on the second supporting member, and the temperature sensor detects a surface temperature of a heating roller disposed between the front panel and the rear panel.

9 Claims, 11 Drawing Sheets

(51) Int. Cl.
*B41F 23/04* (2006.01)
*B41J 11/00* (2006.01)

(56) References Cited

U.S. PATENT DOCUMENTS

| | | | | |
|---|---|---|---|---|
| 2010/0328408 | A1 | 12/2010 | Akiyama et al. | |
| 2011/0128334 | A1 | 6/2011 | Akiyama et al. | |
| 2014/0232797 | A1 | 8/2014 | Onodera et al. | |
| 2014/0253651 | A1 | 9/2014 | Akiyama et al. | |
| 2015/0174921 | A1 | 6/2015 | Onodera et al. | |
| 2015/0192883 | A1* | 7/2015 | Suzuki ............... | G03G 15/2039 399/330 |
| 2015/0352841 | A1 | 12/2015 | Horie | |
| 2016/0075146 | A1 | 3/2016 | Akiyama et al. | |
| 2016/0273832 | A1 | 9/2016 | Asada et al. | |
| 2017/0120625 | A1* | 5/2017 | Yoshinuma ........ | B41J 11/00242 |
| 2017/0157951 | A1 | 6/2017 | Onodera | |
| 2017/0165962 | A1 | 6/2017 | Mizutani et al. | |
| 2017/0232770 | A1 | 8/2017 | Akiyama et al. | |
| 2017/0266990 | A1 | 9/2017 | Yoshinuma et al. | |
| 2017/0266991 | A1 | 9/2017 | Onodera et al. | |
| 2017/0334217 | A1 | 11/2017 | Yoshinuma et al. | |
| 2018/0009237 | A1 | 1/2018 | Sakamoto et al. | |
| 2018/0264803 | A1 | 9/2018 | Hoshino et al. | |
| 2018/0264848 | A1 | 9/2018 | Nagasawa et al. | |
| 2018/0264849 | A1 | 9/2018 | Kitaoka et al. | |
| 2019/0084320 | A1 | 3/2019 | Iwasaki et al. | |
| 2019/0100031 | A1 | 4/2019 | Nishimura et al. | |
| 2019/0283398 | A1 | 9/2019 | Maeyama et al. | |
| 2019/0337307 | A1 | 11/2019 | Onodera et al. | |
| 2019/0344589 | A1 | 11/2019 | Onodera et al. | |
| 2020/0001622 | A1 | 1/2020 | Kitaoka et al. | |
| 2020/0164663 | A1 | 5/2020 | Nishimura et al. | |
| 2020/0298595 | A1 | 9/2020 | Kitamura | |
| 2020/0307259 | A1 | 10/2020 | Yorimoto et al. | |
| 2021/0155015 | A1 | 5/2021 | Akiyama | |
| 2022/0143971 | A1 | 5/2022 | Maruoka | |
| 2022/0174159 | A1 | 6/2022 | Maruoka | |
| 2022/0281233 | A1 | 9/2022 | Onodera | |
| 2023/0117336 | A1 | 4/2023 | Suzuki et al. | |
| 2023/0150282 | A1 | 5/2023 | Terai | |

FOREIGN PATENT DOCUMENTS

| | | | |
|---|---|---|---|
| JP | 2005024330 | A | 1/2005 |
| JP | 2017083088 | A | 5/2017 |
| JP | 2020-106219 | | 7/2020 |

* cited by examiner

SUPPORTING STRUCTURE FOR TEMPERATURE SENSOR AND DRYING DEVICE

CROSS-REFERENCE TO RELATED APPLICATION

This patent application is based on and claims priority pursuant to 35 U.S.C. § 119(a) to Japanese Patent Application No. 2022-090935, filed on Jun. 3, 2022, in the Japan Patent Office, the entire disclosure of which is hereby incorporated by reference herein.

BACKGROUND

Technical Field

Embodiments of the present disclosure relate to a supporting structure for a temperature sensor and to a drying device.

Background Art

In order to increase the durability of ink fixation, there are some cases in which a box-shaped drying device is arranged between an image forming apparatus in which images are printed on a roll sheet and a device such as a winding device and a chiller device that performs post-processing on the printed roll sheet. Such a drying device has a front panel and a rear panel, and multiple heating roller units are arranged between the pair of side panels.

A recording medium such as a continuous sheet that is coated with ink or the treatment liquid is looped around multiple heating rollers of a heating roller unit such that the recording medium is dried.

Some of the multiple heating rollers has an integrated heat source such as a halogen lamp, and the temperature of such an integrated heat source is controlled using a temperature sensor such as a thermopile.

SUMMARY

Embodiments of the present disclosure described herein provide a supporting structure for a temperature sensor, and a drying device provided with the supporting structure. The supporting structure includes a front panel, a rear panel, a first supporting member having both ends in a longer-side direction of the first supporting member, and a second supporting member attachable to and detachable from the first supporting member. In the supporting structure, both ends of the first supporting member are removably supported by the front panel and the rear panel. In the supporting structure, the temperature sensor is disposed on the second supporting member, and the temperature sensor detects surface temperature of a heating roller disposed between the front panel and the rear panel.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1A:
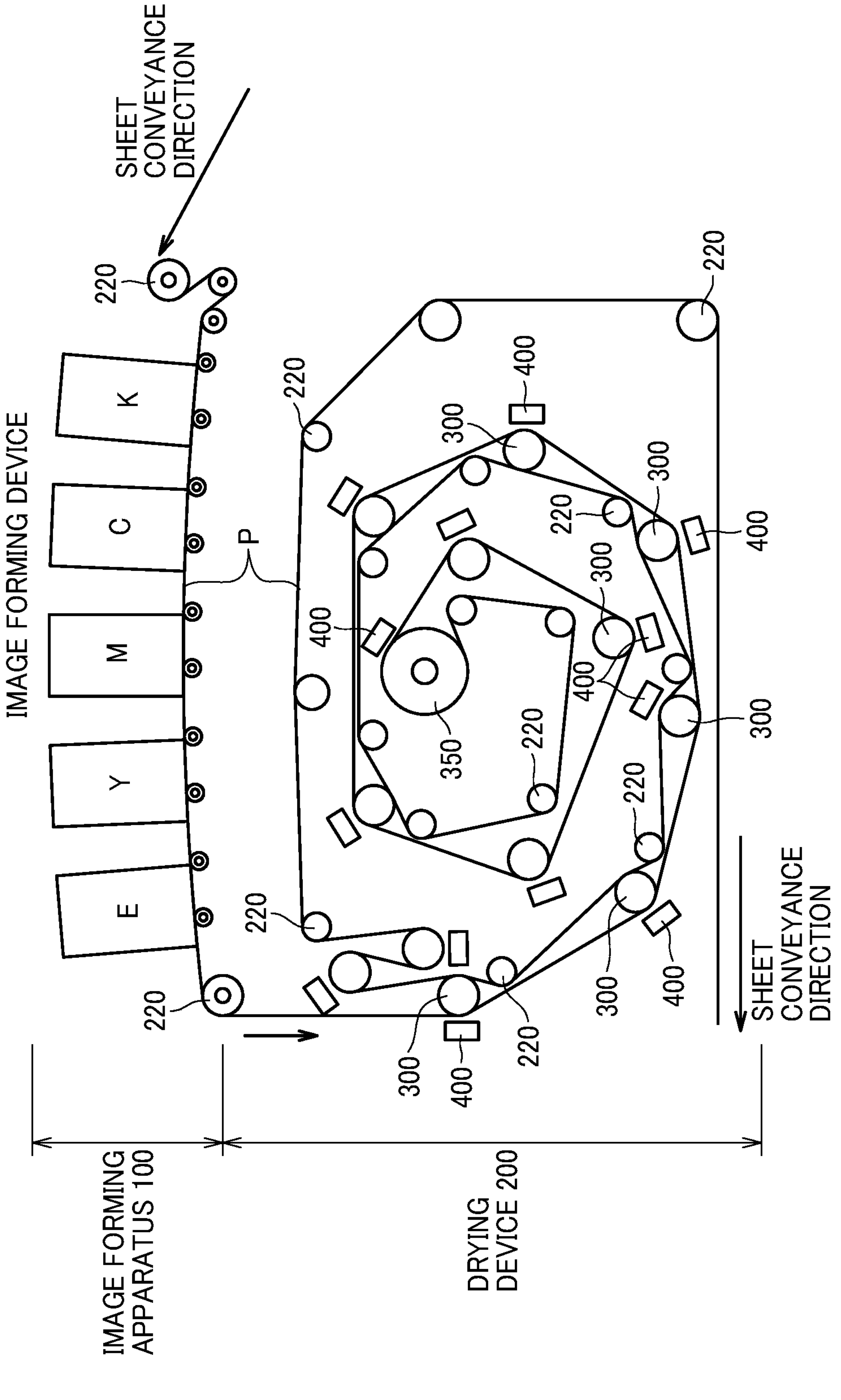
FIG. 1A is a schematic diagram of an image forming apparatus and a drying device arranged in a subsequent stage downstream from the image forming apparatus, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms “a”, “an”, and “the” are intended to include the plural forms as well, unless the context clearly indicates otherwise. It will be further understood that the terms “includes” and/or “including”, when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Drying Device

A drying device 200 according to an embodiment of the present disclosure and the supporting structure of a thermopile 430 according to an embodiment of the present disclosure that serves as a temperature sensor to detect the temperature of a heating roller 310 of the drying device 200 are described below with reference to the accompanying drawings.

FIG. 1A is a schematic diagram of an image forming apparatus 100 and a drying device 200 arranged in a subsequent stage downstream from the image forming apparatus 100, according to an embodiment of the present disclosure.

Figure 1B:
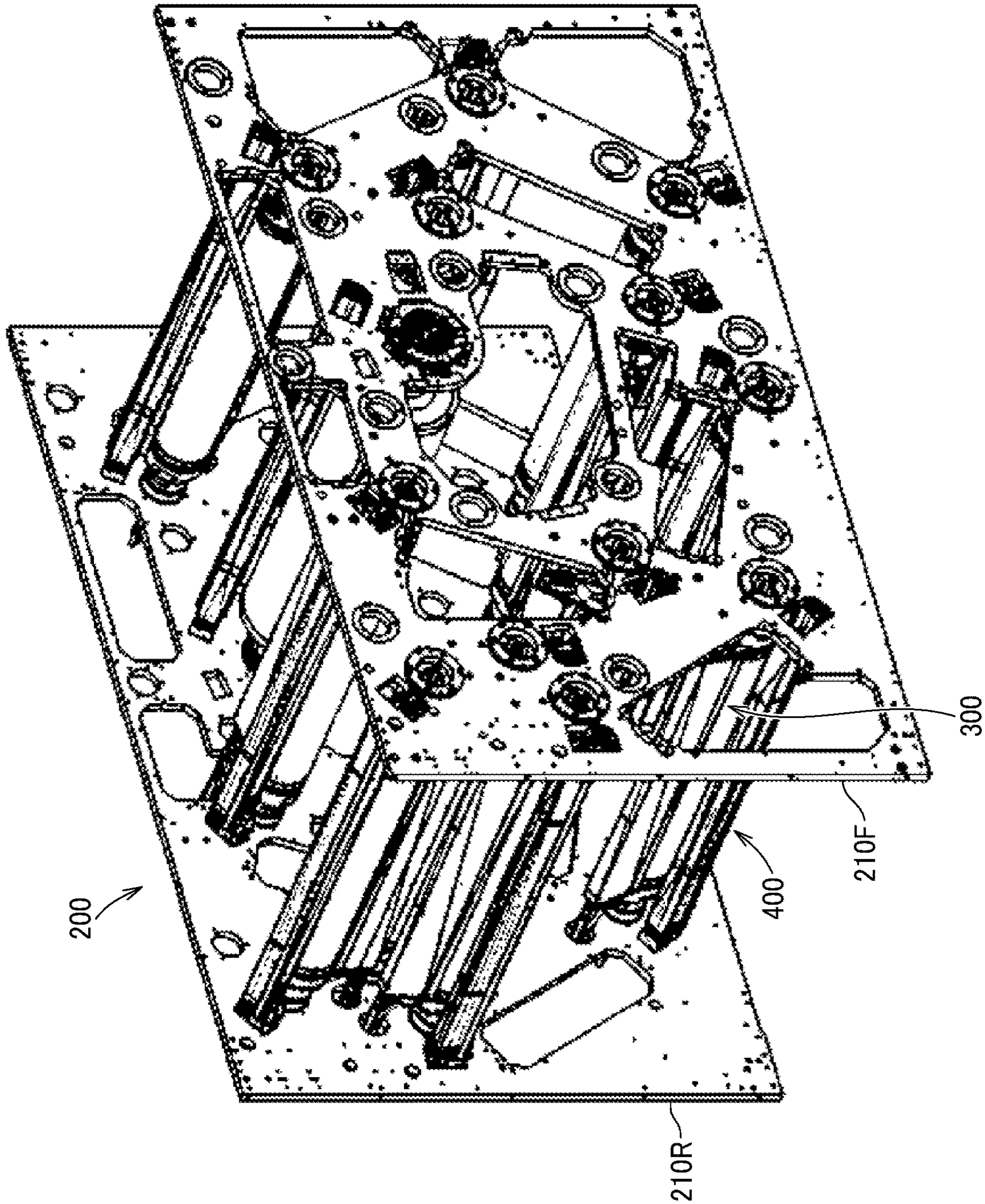
FIG. 1B is a perspective view of a drying device according to an embodiment of the present disclosure.

FIG. 1B is a perspective view of the drying device 200 according to the present embodiment.

The image forming apparatus 100 according to the present embodiment is an inkjet recording apparatus, and provided with five inkjet heads each of which serves as an ink-droplet discharger. In other words, the image forming apparatus 100 according to the present embodiment is provided with five inkjet heads of colors including black (K), cyan (C), magenta (M), yellow (Y), and special color E from an upstream portion to a downstream portion of the apparatus in the sheet conveyance direction.

The special color E is, for example, orange color. The types and number of colors are not limited to the above.

The image forming apparatus 100 ejects ink from five inkjet heads onto a continuous sheet P that serves as a recording medium. As a result, an image is formed on the continuous sheet P.

The continuous sheet P according to the present embodiment is a belt-like sheet. The material of the continuous sheet P is, for example, a sheet of paper, an overhead projector (OHP) sheet, threads, fibers, leather, metal, plastic, or vinyl, and the continuous sheet P may be all sorts of medium on which ink or some sort of liquid is adhered to form an image.

As a matter of course, the embodiments of the present disclosure can be applied to the drying device of a printer that uses a sheet material such as a cut sheet instead of the continuous sheet P. The continuous sheet P to which ink or some sort of liquid has been applied by the image forming apparatus 100 passes through the drying device 200, and then is sent to a chiller device or a winding device at a downstream portion of the entire apparatus.

As illustrated in FIG. 1B, the drying device 200 according to the present embodiment is box-shaped and is provided with a front panel 210F and a rear panel 210R. A plurality of conveying rollers 220, a plurality of heating roller units 300, and a plurality of thermopile units 400 are arranged between the front panel 210F and the rear panel 210R. A slightly large heating drum 350 is arranged substantially at the center of the drying device 200.

The temperatures of the multiple heating roller units 300 and the heating drum 350 are detected by the multiple thermopile units 400, and the temperatures of the heating drum 350 and a plurality of heating rollers 310 of the multiple heating roller units 300 are controlled by a controller.

In the present embodiment, the continuous sheet P is spirally guided to the heating drum 350 at the center of the apparatus by the multiple conveying rollers 220 and the multiple heating roller units 300. Then, the continuous sheet P that has passed through the heating drum 350 is spirally guided in the reverse direction by the multiple conveying rollers 220 and the multiple heating roller units 300. In this manner, the continuous sheet P is brought in contact with the multiple heating rollers 310 of the multiple heating roller units 300 from two varying directions of the liquid-applied surface and the reverse side. As a result, the continuous sheet P is evenly heated and dried.

Heating Roller Unit and Thermopile Unit

The heating roller unit 300 and thermopile unit 400 according to the present embodiment are described below with reference to FIG. 2A, FIG. 2B, FIG. 2C, FIG. 2D, FIG. 2E, and FIG. 2F.

Figure 2A:
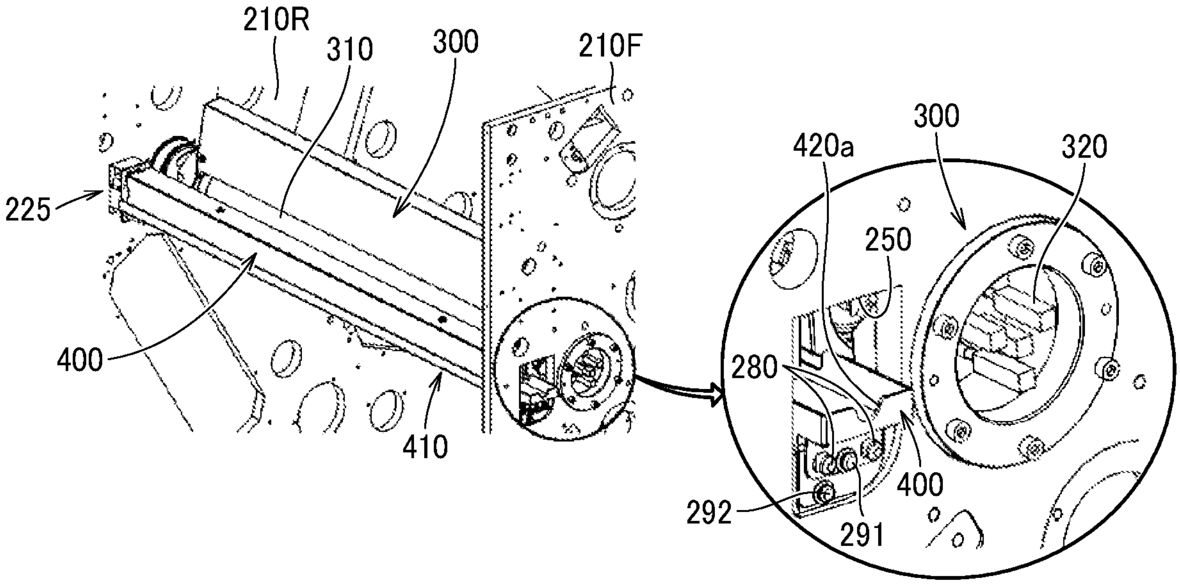
FIG. 2A is a perspective view of a heating roller unit and a thermopile unit according to an embodiment of the present disclosure.

FIG. 2A is a perspective view of a heating roller unit 300 and a thermopile unit 400 according to the present embodiment.

As illustrated in FIG. 2A, a heating roller unit 300 and a thermopile unit 400 are disposed between a front panel 210F and a rear panel 210R.

In other words, both ends of the heating roller unit 300 and thermopile unit 400 in the longer-side direction are supported by the front panel 210F and the rear panel 210R. A rectangular opening 250 is formed in the front panel 210F to allow thermopile unit 400 to loaded or unloaded in the longer-side direction.

The heating roller unit 300 according to the present embodiment includes a heating roller 310 and a heater lamp 320 arranged inside the heating roller 310. In the present embodiment, a set of four heater lamps 320 is arranged. As will be described later in detail with reference to FIG. 3C, the four heater lamps 320 according to the present embodiment include three peripheral heater lamps 320 having a relatively long heating area A and one central heater lamp 320 having a relatively short heating area B. The continuous sheet P that has two different widths can be dealt with making use of the two different heating areas A and B.

The continuous sheet P is conveyed in the direction indicated by arrow by means for conveying the continuous sheet P located upstream and downstream from each one of the multiple conveying rollers 220. During the conveyance of the continuous sheet P, each one of the multiple heating rollers 310 is heated by the multiple heater lamps 320 while the heating roller is rotating. Due to such a configuration, the continuous sheet P that is conveyed in contact with the multiple heating rollers 310 is continuously heated and dried.

The thermopile unit 400 according to the present embodiment includes a first supporting member 410 and a second supporting member 420. The second supporting member 420 is provided with a thermopile 430. The lengths of the first supporting member 410 and the second supporting member 420 are approximately equivalent to the distance between the front panel 210F and the rear panel 210R.

Figure 2B:
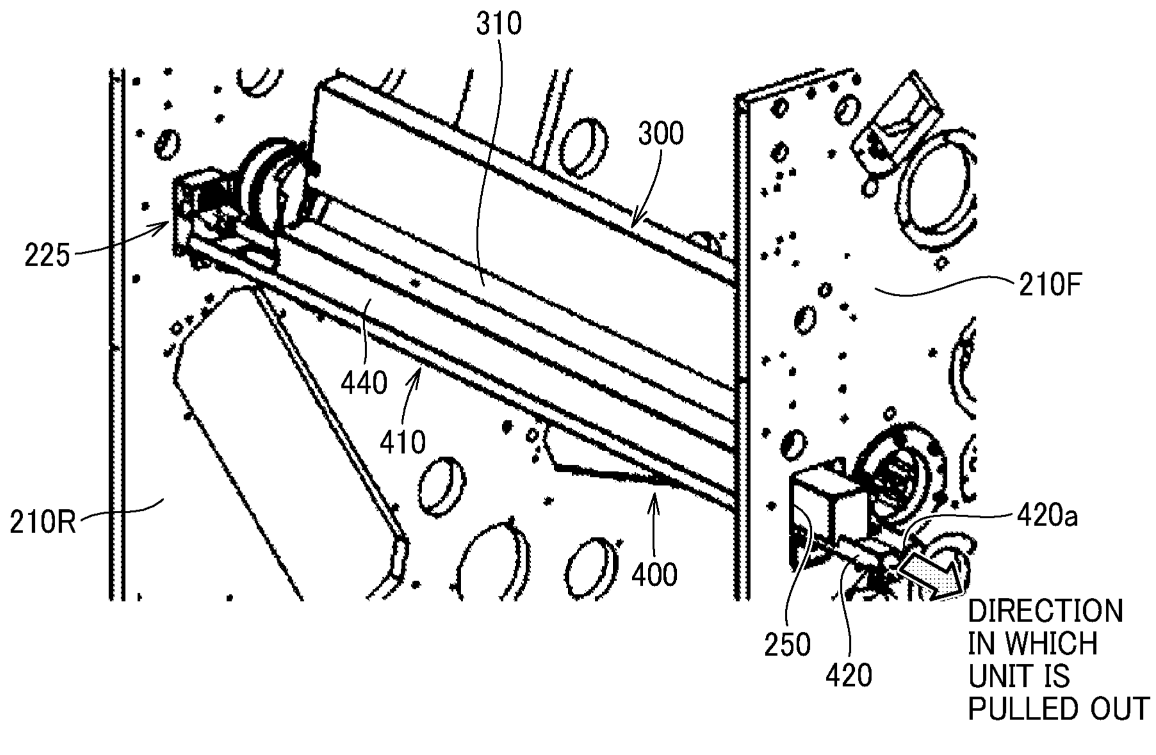
FIG. 2B is a perspective view of a heating roller unit and a thermopile unit, where the thermopile unit is being pulled out, according to an embodiment of the present disclosure.
Figure 2C:
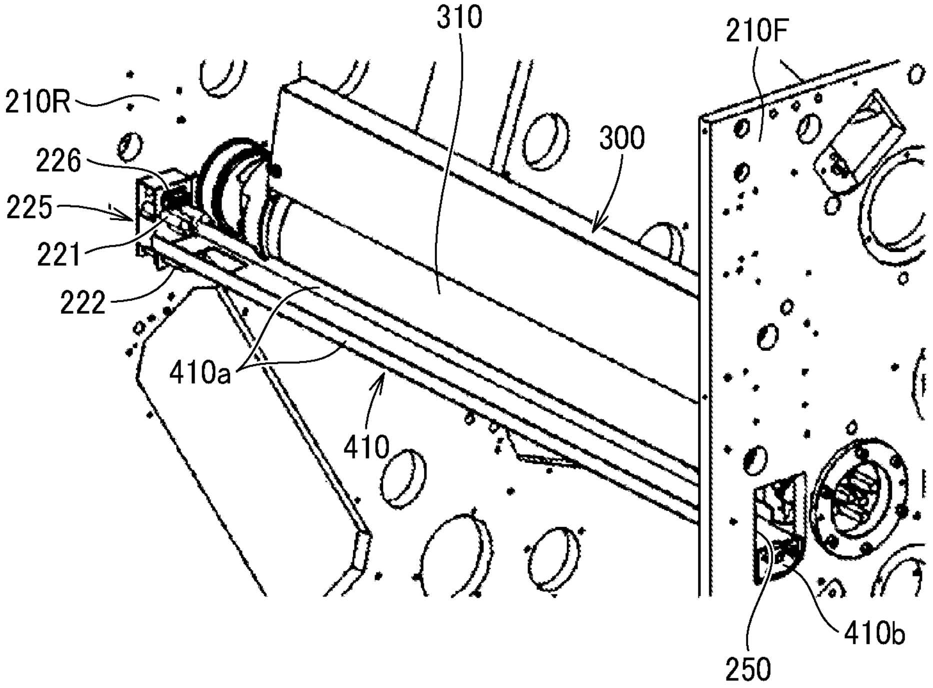
FIG. 2C is a perspective view of a heating roller unit and a thermopile unit, where a second supporting member has been pulled out and a first supporting member is left, according to an embodiment of the present disclosure.
Figure 2D:
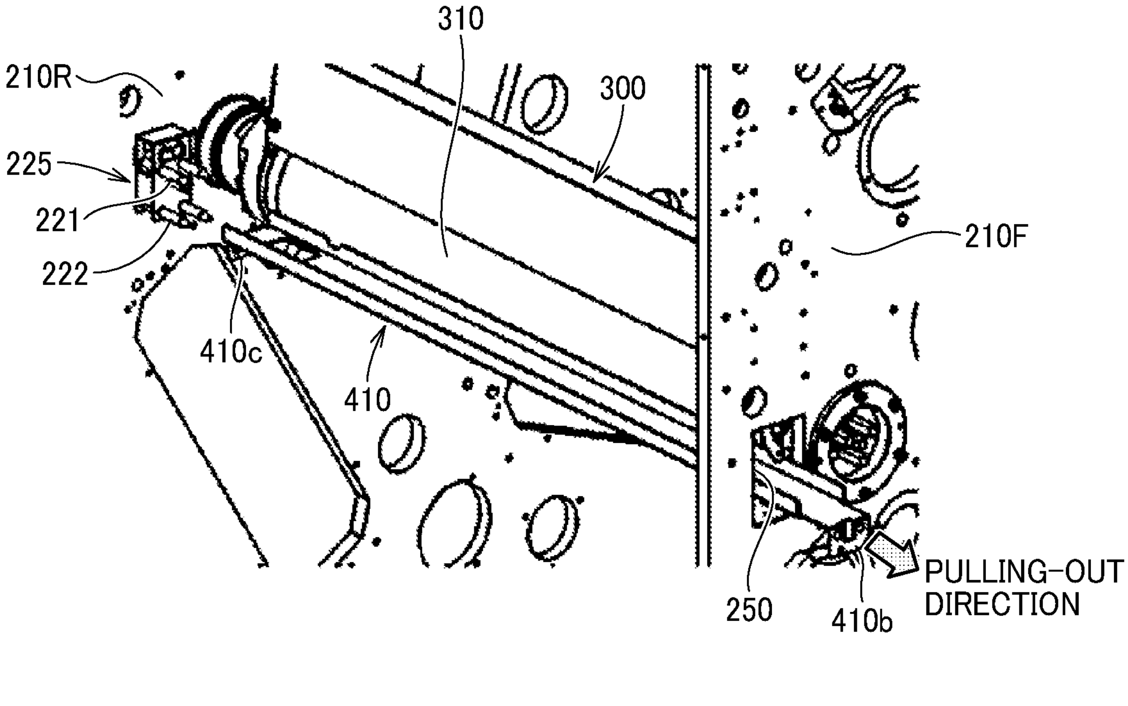
FIG. 2D is a perspective view of a heating roller unit and a thermopile unit, where a first supporting member is being pulled out, according to an embodiment of the present disclosure.
Figure 2E:
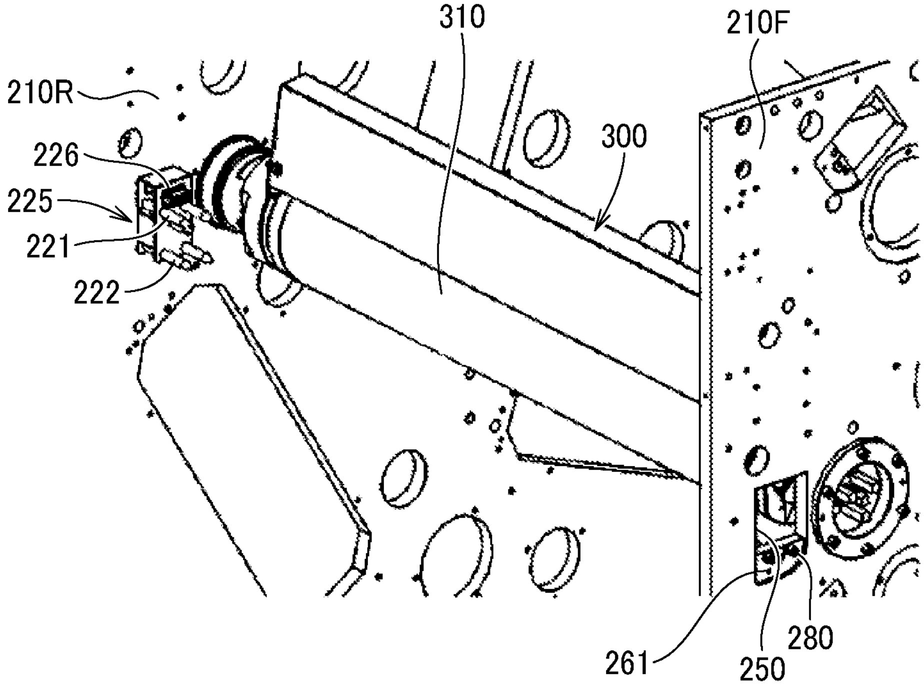
FIG. 2E is a perspective view of a heating roller unit and a thermopile unit, where a first supporting member has been pulled out and the heating roller unit is left, according to an embodiment of the present disclosure.
Figure 2F:
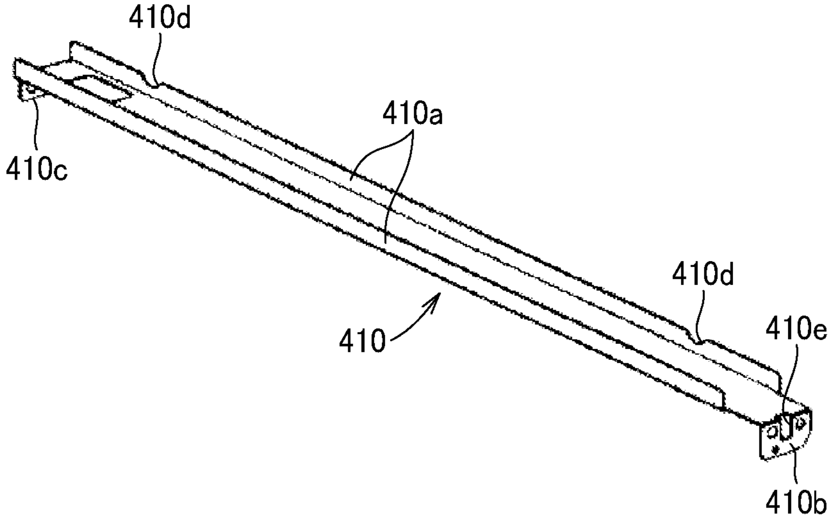
FIG. 2F is a perspective view of a pulled-out first supporting member, according to an embodiment of the present disclosure.

As illustrated in FIG. 2F, the first supporting member 410 according to the present embodiment is shaped like a long slender rail and has a U-shaped cross section. Both ends of the first supporting member 410 in the longer-side direction are positioned and fixed to the front panel 210F and the rear panel 210R in a detachable manner.

Figure 3A:
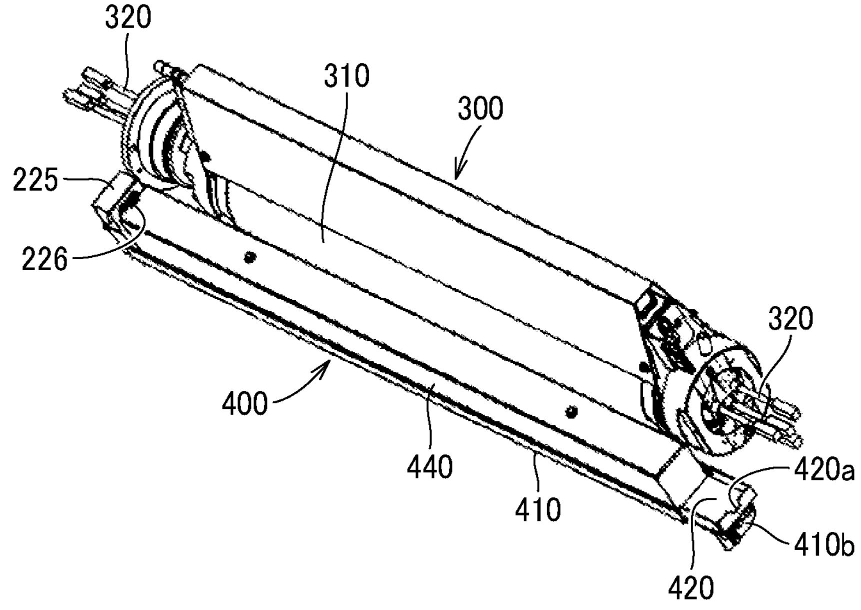
FIG. 3A is another perspective view of a heating roller unit and a thermopile unit according to an embodiment of the present disclosure.

FIG. 3A is another perspective view of the heating roller unit 300 and the thermopile unit 400 according to the present embodiment.

The second supporting member 420 can be mounted on the first supporting member 410 in a detachable manner. As illustrated in FIG. 3A, the second supporting member 420 has a long slender box-shaped cover 440 on the second supporting member 420.

Figure 3B:
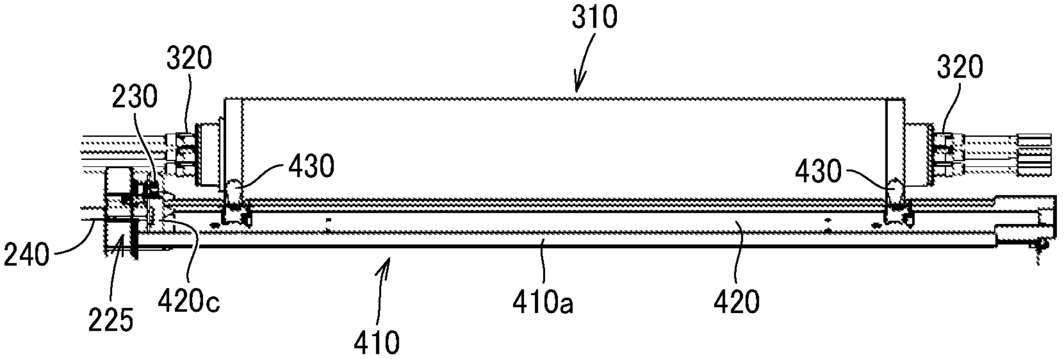
FIG. 3B is a plan view of a heating roller and a thermopile and illustrates the relative positions of the thermopile to the heating roller, according to an embodiment of the present disclosure.

FIG. 3B is a plan view of the heating roller 310 and the thermopile 430 and illustrates the relative positions of the thermopile 430 to the heating roller 310, according to the present embodiment.

Figure 3C:
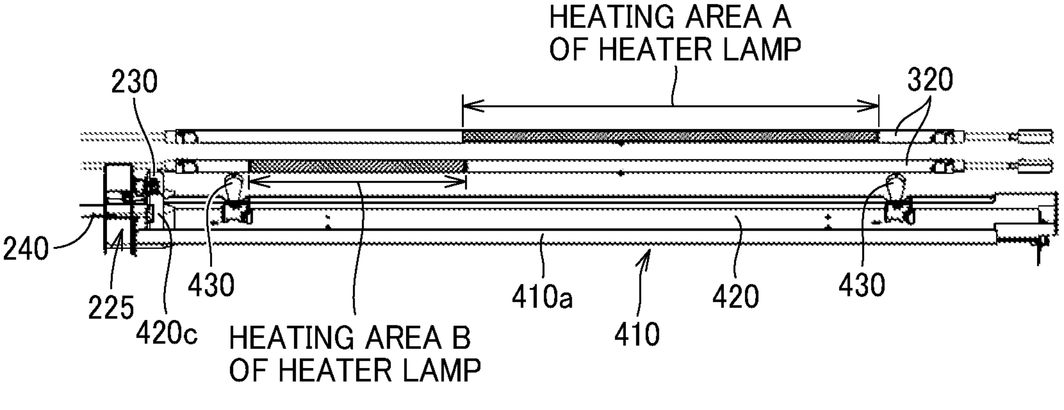
FIG. 3C is a plan view of a heater lamp and a thermopile and illustrates the relative positions of the thermopile to the heater lamp, according to an embodiment of the present disclosure.

As illustrated in FIG. 3B and FIG. 3C, a thermopile 430 that serves as a temperature sensor is accommodated inside the cover 440. The cover 440 according to the present embodiment protects the thermopiles 430 from, for example, the dust in the drying device 200, and as will be described later in detail, also serves as an air path that guides the cooling air to each one of the multiple thermopiles 430 supplied from the air duct 240 at the rear.

The first supporting member 410 according to the present embodiment has a pair of rising portions 410*a* that vertically rise at both ends in the shorter-side direction, and this pair of rising portions 410*a* guide and align the second supporting member 420 in the shorter-side direction.

As illustrated in FIG. 1A, thermopile unit 400 according to the present embodiment may be implemented in varying orientations or postures. As the second supporting member 420 is guided and aligned in the shorter-side direction by the pair of rising portions 410*a*, the posture or angle of each one of the thermopiles 430 can be stabilized when implemented. In order to avoid the interference with the thermopiles 430, a pair of right and left notches 410*d* are formed in the pair of rising portions 410*a*.

Front and Rear Positioning

As illustrated in FIG. 3D, FIG. 3E, FIG. 4A, FIG. 4B, and FIG. 4C, a pair of positioning pins 221, a pair of positioning pins 222, and a pair of positioning pins 280 are arranged on the rear panel 210R and the front panel 210F. The pair of positioning pins 221 and the pair of positioning pins 222 together serve as the first positioning pins to determines the relative positions of the first supporting member 410 and the second supporting member 420, and the pair of positioning pins 280 serve as the second positioning pins. The pair of positioning pins 280 at the front are arranged adjacent to the opening 250. The axial directions of the pair of positioning pins 221, the pair of positioning pins 222, and the pair of positioning pins 280 are the same as or parallel to the direction perpendicular to the rear panel 210R and the front panel 210F, i.e., the direction in which the first supporting member 410 and the second supporting member 420 are inserted or withdrawn for installation or removal.

The position of the thermopile 430 when implemented can be prevented from being displaced by those pins including the pair of positioning pins 221, the pair of positioning pins 222, and the pair of positioning pins 280. As illustrated in FIG. 1A, thermopile unit 400 according to the present embodiment may be implemented in varying orientations or postures depending on the location. For this reason, by determining the relative positions of the front and rear portions of the thermopile unit 400 to the other elements of the apparatus with a high degree of precision, the posture or angle of each one of the thermopiles 430 can be stabilized when implemented. Moreover, the accuracy of the detection of the surface temperature on the multiple heating rollers 310 can be increased.

FIG. 2D is a perspective view of the heating roller unit 300 and the thermopile unit 400, where the first supporting member 410 is being pulled out, according to the present embodiment.

FIG. 2E is a perspective view of the heating roller unit 300 and the thermopile unit 400, where the first supporting member 410 has been pulled out and the heating roller unit 300 is left, according to the present embodiment.

As illustrated in FIG. 2D and FIG. 2E, the pair of positioning pins 221 and 222 on the rear side are arranged on a positioning member 225 fixed onto the rear panel 210R. The front ends of these pins including the pair of positioning pins 221 and the pair of positioning pins 222 are tapered such that the insertion into positioning holes of the first supporting member 410 and the second supporting member 420 will be easy, as will be described later in detail. By contrast, the pair of right and left positioning pins 280 of the front panel 210F are positioned and aligned upon being inserted into the positioning holes formed at the front ends of the first supporting member 410 and the second supporting member 420.

Figure 3D:
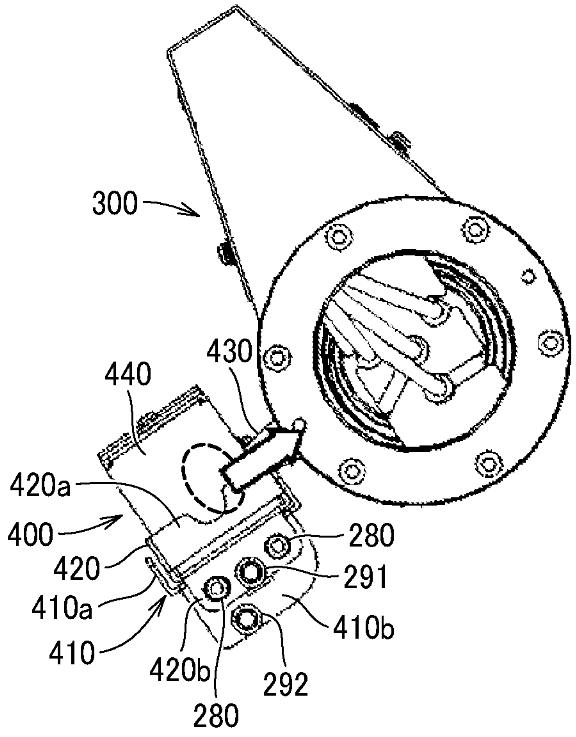
FIG. 3D is an end view of a heating roller unit and a thermopile unit according to an embodiment of the present disclosure.

In other words, as illustrated in FIG. 3D, the pair of positioning pins 280 of the front panel 210F are inserted into the positioning holes formed on the bent piece 410*b* of the front end of the first supporting member 410, and the same pair of positioning pins 280 are inserted into the positioning holes formed on the bent piece 420*b* of the front end of the second supporting member 420.

Figure 4A:
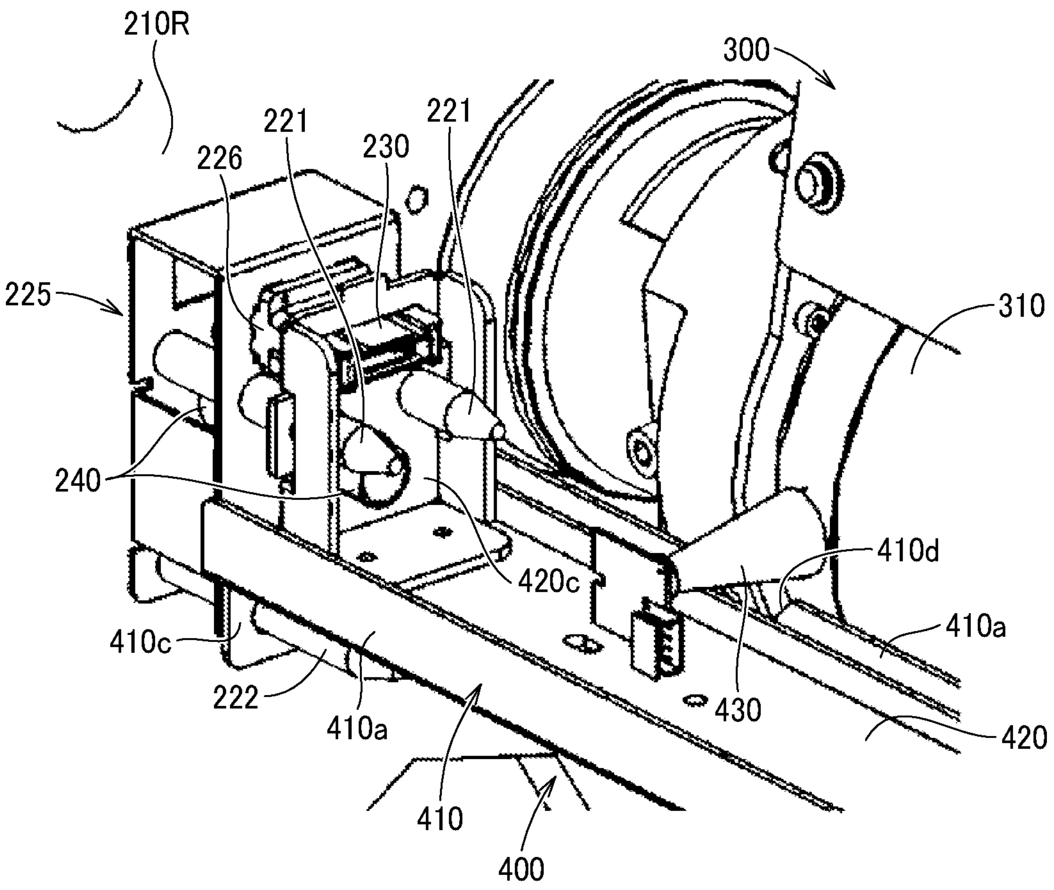
FIG. 4A is a perspective view of a heating roller unit and a thermopile unit on the rear end, according to an embodiment of the present disclosure.
Figure 4B:
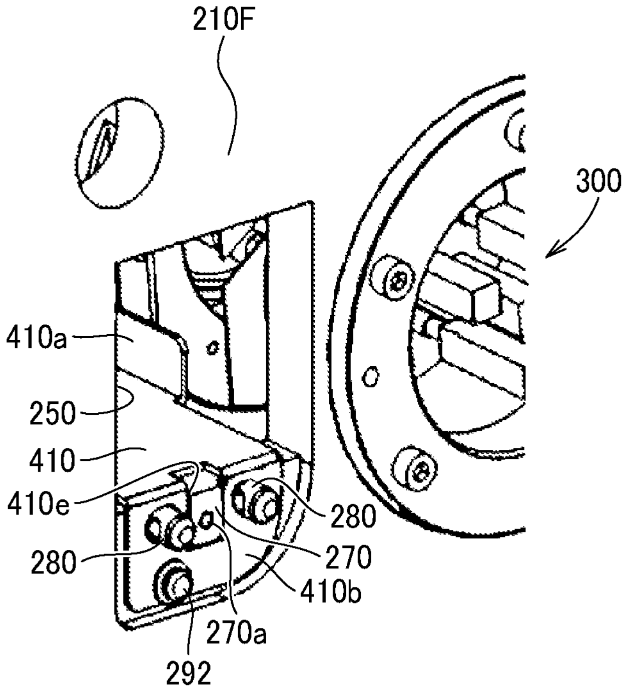
FIG. 4B is a perspective view of a first supporting member on the front end, according to an embodiment of the present disclosure.
Figure 4C:
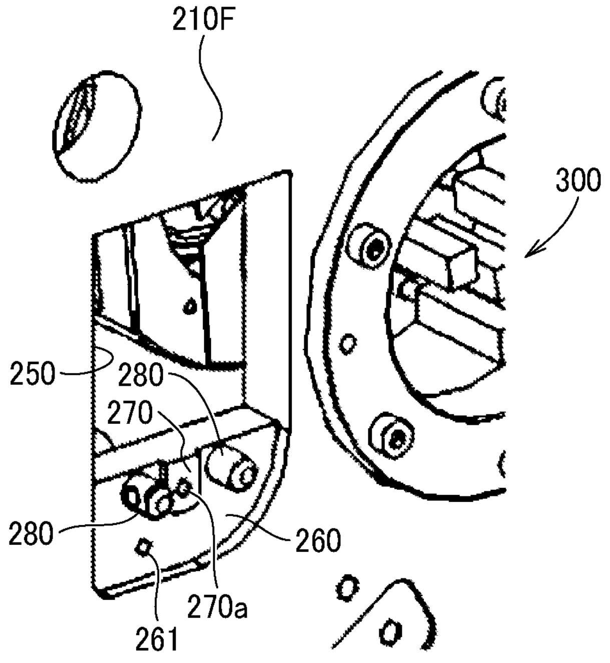
FIG. 4C is a perspective view of a front panel and an opening formed thereon, where a first supporting member has been removed, according to an embodiment of the present disclosure.

FIG. 4C is a perspective view of the front panel 210F and the opening 250 formed thereon, where the first supporting member 410 has been removed, according to the present embodiment.

The bent piece 410*b* of the first supporting member 410 is fixed to the front panel 210F as a screw 292 is screwed into a screw hole 261 (see FIG. 4C) of the front panel 210F from the front side. The bent piece 420*b* of the second supporting member 420 is fixed to the front panel 210F as a screw 291 is screwed into a screw hole 270*a* (see FIG. 4C) formed on a raised portion 270 of the front panel 210F from the front side.

Figure 3E:
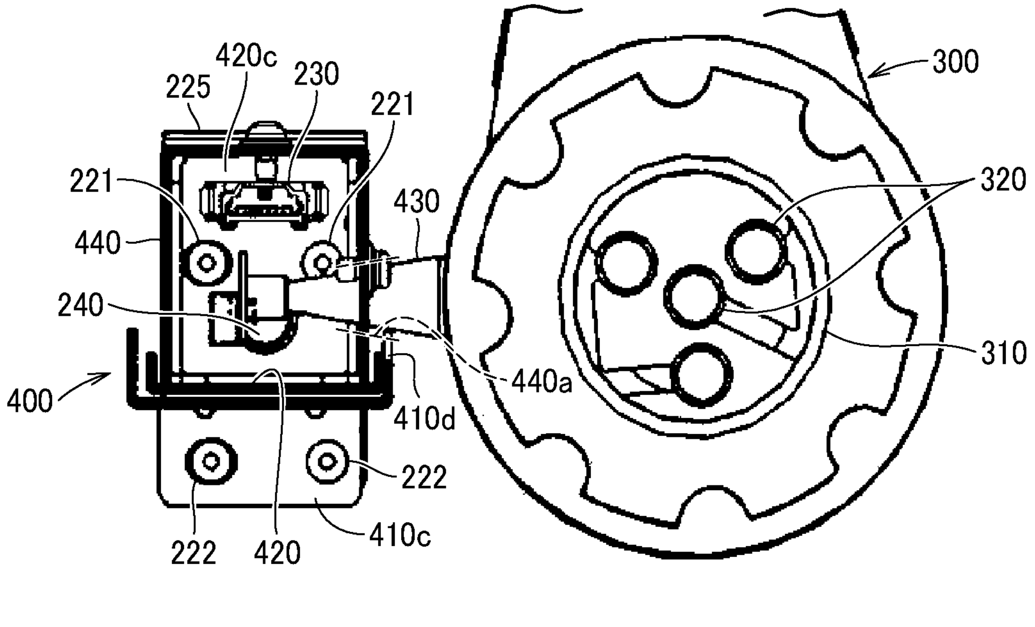
FIG. 3E is a sectional view of a heating roller unit and a thermopile unit according to an embodiment of the present disclosure.

The pair of right and left positioning pins 221 and 222 are arranged on the rear panel 210R. As illustrated in FIG. 4A, the pair of right and left positioning pins 221 in the upper portion as illustrated in FIG. 3E are inserted into the pair of positioning holes formed on the bracket 420*c* of the rear end of the second supporting member 420. As illustrated in FIG. 4A, the pair of right and left positioning pins 222 in the lower portion as illustrated in FIG. 3E are inserted into the pair of positioning holes formed on the bent piece 410*c* of the rear end of the first supporting member 410.

Introduction of Cooling Air

As illustrated in FIG. 4A, an air duct 240 is coupled to the bracket 420*c* of the rear end of the second supporting member 420. As will be described later in detail with reference to FIG. 5A and FIG. 5B, the air duct 240 according to the present embodiment is coupled to a fan 500 arranged on the rear side of the rear panel 210R. In the related art, an air duct and a fan are arranged separately for both the front and the rear. By contrast, in the present embodiments of the present disclosure, the air duct 240 and the fan 500 are used for the rear but no air duct or fan are used for the front.

The bracket 420*c* according to the present embodiment is covered with a cover 440 together with thermopile 430. The cooling air that is flown into the cover 440 through the air duct 240 flows from the rear to the front of the cover 440.

The cover 440 is formed with a through hole 440*a* through which the outer circumferential surface of the heating roller 310 can be seen through from the thermopile 430 (see, for example, FIG. 3E). The cooling air can be exhausted to the outside of the cover 440 through the through hole 440*a*.

Figure 5A:
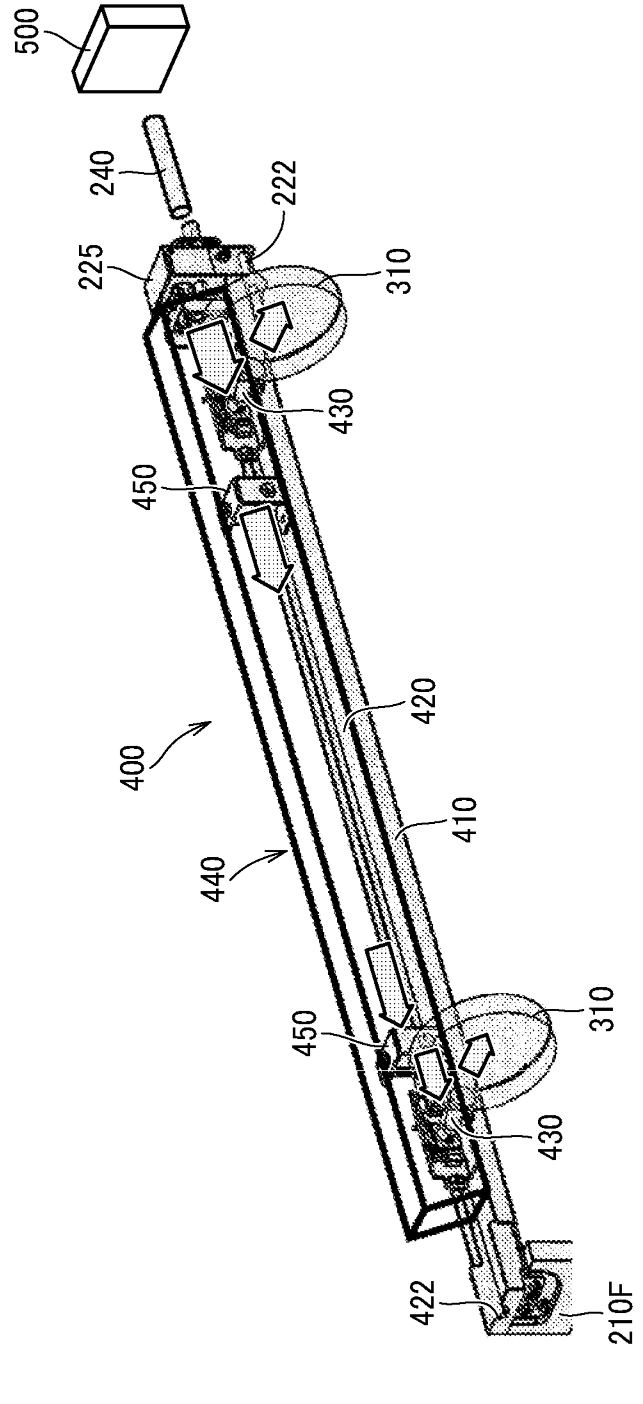
FIG. 5A is a perspective view of a thermopile unit and illustrates a cover in a see-through manner, according to an embodiment of the present disclosure.
Figure 5B:
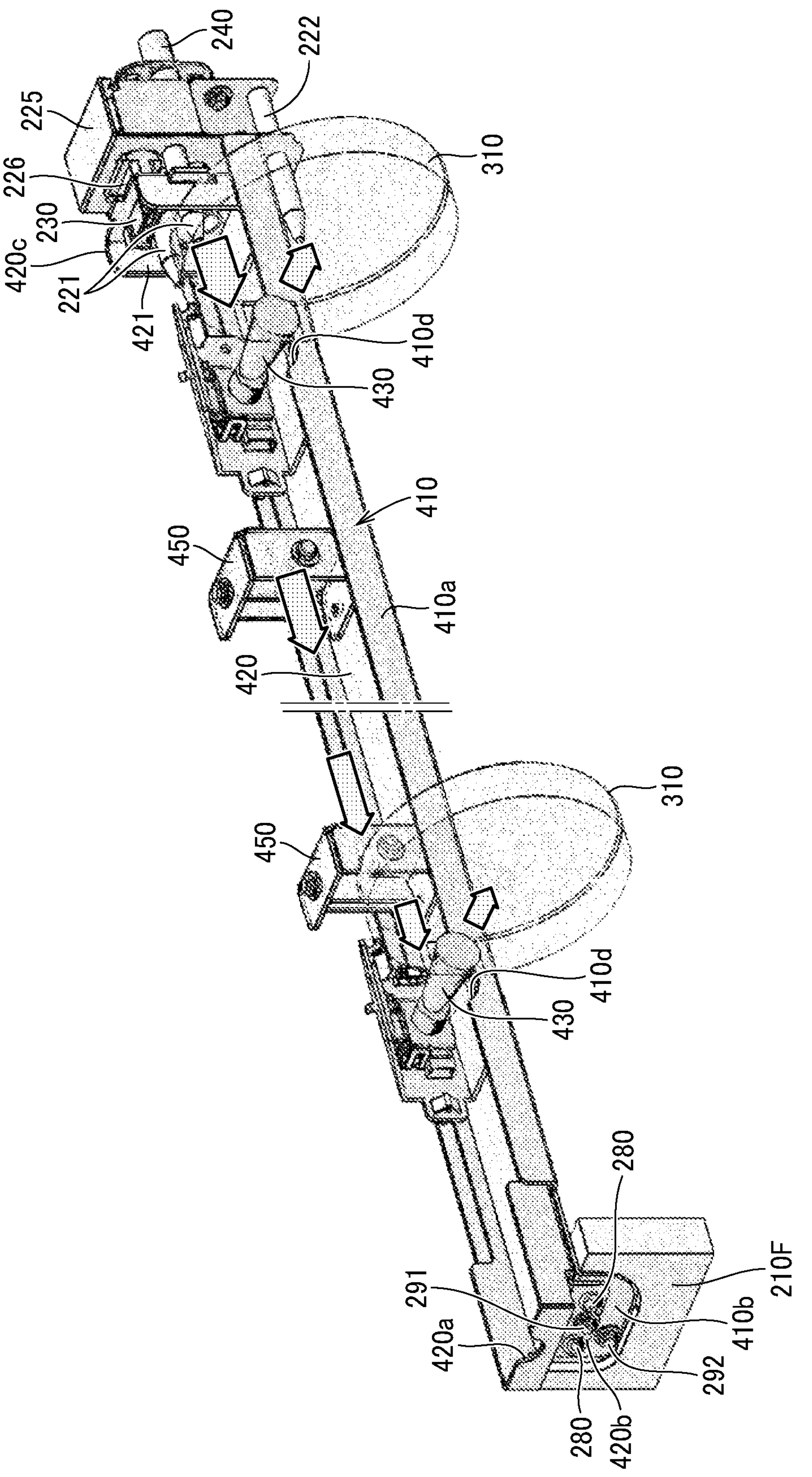
FIG. 5B is a perspective view of a thermopile unit where a cover and a portion in the middle in the longer-side direction are omitted in illustration, according to an embodiment of the present disclosure.

As illustrated in FIG. 5A and FIG. 5B, a pair of flow-rate adjusting orifices 450 are arranged on the second supporting member 420 between the pair of front and rear thermopiles 430 at the front and the rear, respectively. The flow-rate adjusting orifice 450 has an opening crossing the inside of the cover 440 in the shorter-side direction, and adjusts the flow rate of the cooling air flowing to thermopile 430 through the opening.

Both the pair of flow-rate adjusting orifices 450 may be arranged upstream from the front and rear thermopiles 430. However, according to the experiment in which the flow rate of the cooling air was measured, it is difficult to adjust the flow rate of the cooling air flowing through the pair of thermopiles 430 when the pair of flow-rate adjusting orifices 450 are arranged upstream from the rear thermopile 430. The bracket 420*c* is arranged upstream from the rear thermopile 430. For this reason, there is little room for space.

In order to handle such a situation, in the present embodiment, the pair of flow-rate adjusting orifices 450 are arranged upstream from the front thermopile 430 and downstream from the rear thermopile 430. Due to the arrangement of the pair of flow-rate adjusting orifices 450 as in the present embodiment, the flow rates of the cooling air of the pair of thermopiles 430 can easily be adjusted to be equal to each other.

Removal of Thermopile Unit

In FIG. 2A, the two screws 291 and 292 on the front side of the drying device 200 may be removed in order to remove the entirety of the thermopile unit 400 from the drying device 200. Due to such a configuration, the entirety of the thermopile unit 400 can be pulled out to the front from the opening 250 of the front panel 210F. When the entirety of the thermopile unit 400 is to be pulled out, pulling out becomes easy if a finger is put on an arc-shaped knob 420*a* at the front of the second supporting member 420.

FIG. 2B is a perspective view of the heating roller unit 300 and the thermopile unit 400, where the thermopile unit 400 is being pulled out, according to the present embodiment.

The second supporting member 420 and the first supporting member 410 of thermopile unit 400 can be detached in the order listed. In order to achieve such detachment, firstly, only one of the multiple screws 291 is removed in FIG. 2A. By so doing, the second supporting member 420 into which the thermopile 430 is integrated can be pulled out to the front from the opening 250 of the front panel 210F. In FIG. 2B, the front corresponds to the right side.

FIG. 2C is a perspective view of the heating roller unit 300 and the thermopile unit 400, where the second supporting member 420 equipped with the thermopile 430 has been removed and the first supporting member 410 is left, according to the present embodiment.

The first supporting member 410 still remains beside the heating roller unit 300. It is not necessary to remove the first supporting member 410 to inspect and replace the thermopile 430.

If the first supporting member 410 is left between the front panel 210F and the rear panel 210R, the second supporting member 420 can be reattached in a short time after the inspection and replacement of the thermopile 430. In this reattachment, the first supporting member 410 serves as a guide rail for the second supporting member 420.

The rear portion of the second supporting member 420 is inserted into the opening 250 of the front panel 210F, the second supporting member 420 is slid toward the rear in the longer-side direction of the first supporting member 410. In so doing, the rising portions 410*a* on both sides of the first supporting member 410 in the shorter-side direction guide both right and left sides of the second supporting member 420.

Accordingly, the bracket 420*c* of the second supporting member 420 at the rear can be smoothly aligned with the positioning pin 221 as illustrated in FIG. 4A. Once the second supporting member 420 is inserted to the rear all the way, as illustrated in FIG. 3D, the bent piece 420*b* of the front end is positioned and aligned by the pair of positioning pins 280.

Finally, the screw 291 is tightened to complete the attachment of the second supporting member 420. According to the present embodiment as described above, the second supporting member 420 can easily attached or detached.

If the first supporting member 410 is also detached from the state as illustrated in FIG. 2C, the peripheral portion of the heating roller unit 300 can be more easily accessed, and for example, the inside of the drying device 200 can be more easily inspected or examined. In order to detach the first supporting member 410, the remaining screw 292 is to be removed in the state as illustrated in FIG. 2C. Then, the first supporting member 410 is pulled out to the front from the opening 250 of the front panel 210F as illustrated in FIG. 2D.

As a result, the space between the front panel 210F and the rear panel 210R is widely opened as illustrated in FIG. 2E. Accordingly, the peripheral portion of the heating roller unit 300 can be easily accessed, and for example, the inside of the drying device 200 can be more easily inspected or examined.

FIG. 2F is a perspective view of the detached first supporting member 410, according to the present embodiment.

In the present embodiment, the second supporting member 420 is mounted on the first supporting member 410. Accordingly, the entirety of the thermopile unit 400 can be inserted through the opening 250 of the front panel 210F at a time. However, as a method of attachment, it is easier to insert the first supporting member 410 and the second supporting member 420 from the opening 250 step by step than inserting the entirety of the thermopile unit 400 at a time.

In other words, when the first supporting member 410 is inserted independently, the bent piece 410*c* at the rear can be easily seen through the opening 250 at the front. Accordingly, the bent piece 410*c* at the rear can easily be aligned with the pair of positioning pins 222 at the rear.

Position of Thermopile

The relative positions of the heating roller 310 to thermopile 430 are further described in detail with reference to FIG. 3A, FIG. 3B, FIG. 3C, FIG. 3D, and FIG. 3E.

In FIG. 3B, the cover 440 of thermopile unit 400 as illustrated in FIG. 3A is detached such that the thermopile 430 arranged inside becomes viewable.

The pair of thermopiles 430 are arranged near both ends of the second supporting member 420 in the longer-side direction.

FIG. 3C is a plan view of the heater lamp 320 and the thermopile 430 and illustrates the relative positions of the thermopile 430 to the heater lamp 320, according to the present embodiment.

In FIG. 3C, the heating roller 310 as illustrated in FIG. 3B is detached so that the heater lamp 320 arranged inside becomes viewable.

The upper portions of the heater lamp 320 make up a heating area A, and as illustrated in FIG. 2A and FIG. 3A, the heating area A includes three lamps that are arranged around the center lamp. The lower heater lamp 320 makes up a heating area B, and as illustrated in FIG. 2A and FIG. 3A, the heating area B includes one lamp in the center.

The thermopile 430 on the right is arranged adjacent to a non-heating area or a non-sheet-passing area external to the heating area A of the upper heater lamp 320. The thermopile 430 on the left is arranged adjacent to a non-heating area or a non-sheet-passing area external to the heating area B of the lower heater lamp 320.

The installation angles that the pair of thermopiles 430 form with the heating roller 310 are adjusted to an angle at which the temperature of the non-sheet-passing area can be detected with a high degree of precision. As the temperature of the non-sheet-passing area tends to rise excessively, the temperature of the non-sheet-passing area is detected by thermopile 430 to control the electrical conduction of the heater lamp 320.

FIG. 3D is an end view of the heating roller unit 300 and the thermopile unit 400 according to the present embodiment.

FIG. 3E is a sectional view of the heating roller unit 300 and the thermopile unit 400 according to the present embodiment.

As illustrated in FIG. 3D and FIG. 3E, the cooling air is ejected to the outer circumferential surface of the heating roller 310 from the through hole 440*a* of the cover 440 through which thermopile 430 passes.

As described above, the cooling air passes through the outer regions of the pair of thermopiles 430. By so doing, thermopile 430 can be effectively cooled and the accuracy of the detection improves.

Detailed Front and Rear Positioning

FIG. 4A, FIG. 4B, and FIG. 4C illustrates details of how the thermopile unit 400 is positioned on the front side and the rear side, according to the present embodiment.

FIG. 4A is a perspective view of the heating roller unit 300 and the thermopile unit 400 on the rear end, according to the present embodiment.

FIG. 4A illustrates the positioning member 225 fixed to the rear panel and 210R and its positioning pins 221 and 222, according to the present embodiment.

As described above, the pair of right and left positioning pins 221 in the upper portion are inserted into the pair of positioning holes formed on the bracket 420*c* of the rear end of the second supporting member 420. The pair of right and left positioning pins 222 in the lower portion are inserted into the positioning holes formed on the bent piece 410*c* of the rear end of the first supporting member 410.

A male connector 226 that is electrically conductive with the pair of thermopiles 430 are arranged on the positioning member 225 of the rear panel 210R. A female connector 230 through which the male connector 226 is coupled to the bracket 420*c* in a detachable manner from the longer-side direction of the second supporting member 420 is arranged on the bracket 420*c* of the thermopile unit 400.

FIG. 4B is a perspective view of the first supporting member 410 on the front end indicate how the first supporting member 410 is positioned at the front, according to the present embodiment.

As described above, the pair of right and left positioning pins 280 of the front panel 210F are inserted into the positioning holes formed on the bent piece 410*b* of the front end of the first supporting member 410.

The bent piece 410*b* of the first supporting member 410 is fixed to the front panel 210F as a screw 292 is screwed into a screw hole 261 (see FIG. 4C) of the front panel 210F from the front side. A notch 410*e* of the shape equivalent to that of the raised portion 270 is to be formed on the bent piece 410*b* in advance such that the raised portion 270 and the screw hole 270*a* of the front panel 210F as illustrated in FIG. 4C are not to be covered with the bent piece 410*b* in an undesired manner.

Flow of Cooling Air

The flow of the cooling air is described below with reference to FIG. 5A and FIG. 5B.

FIG. 5A is a perspective view of the thermopile unit 400 and illustrates a cover 440 in a see-through manner, according to the present embodiment.

FIG. 5B is a perspective view of the thermopile unit 400 where the cover 440 and a portion in the middle in the longer-side direction are omitted in the illustration, according to the present embodiment.

A fan 500 is arranged on the rear side of the rear panel 210R, and the cooling air that is blown out from the fan 500 is introduced to the rear side end of the cover 440 of the thermopile unit 400 through the air duct 240.

The air duct 240 penetrates the positioning member 225 and protrudes to the inner side of the rear panel 210R. When thermopile unit 400 is inserted into the apparatus as illustrated in FIG. 5A and FIG. 5B, the tip end of the air duct 240 is inserted into the hole of the bracket 420*c* of thermopile unit 400. Moreover, the front end of the air duct 240 has an opening in the rear end of the cover 440.

When the cooling air is introduced from the air duct 240 to the rear side of the cover 440, the cooling air flows through the cover 440 toward the front. The entire amount of the cooling air is exhausted to the outside through the through hole 440*a* of the cover 440, which is formed ahead of the pair of thermopiles 430 adjacent to the heating roller 310. In so doing, thermopile 430 is cooled, and the accuracy of the detection of the thermopile 430 can be maintained.

If the flow rates of the cooling air that flows through the pair of thermopiles 430 are different from each other, the accuracy of detection may deteriorate. In order to handle such a situation, the pair of flow-rate adjusting orifices 450 are arranged between the pair of thermopiles 430 as described above, and the flow rates of the cooling air that flows through the pair of thermopiles 430 are adjusted so as to be equal to each other.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

For example, the supporting structure for the temperature sensor according to the present the present disclosure is applicable not just to the supporting structure for the temperature sensor used in the drying device, but to the supporting structure for a temperature sensor used to measure the temperature of various kinds of heating devices. For example, the supporting structure for the temperature sensor according to the present the present disclosure is applicable to the supporting structure for a temperature sensor provided for a fixing roller in fixing devices known in the art.

The supporting structure for the temperature sensor according to the present the present disclosure is also applicable to the supporting structure for, for example, an optical device such as a miniature camera or various kinds of sensors such as an optoelectronic detector and a close-proximity sensor, in addition to or in place of the temperature sensor.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. A supporting structure for a temperature sensor, the supporting structure comprising:
- a front panel;
- a rear panel;
- a first supporting member having both ends in a longer-side direction of the first supporting member, the both ends removably supported by the front panel and the rear panel; and
- a second supporting member attachable to and detachable from the first supporting member, the temperature sensor disposed on the second supporting member, the temperature sensor configured to detect a surface temperature of a heating roller of a heating roller unit disposed between the front panel and the rear panel, wherein the second supporting member is configured to be attachable to and detachable from the first supporting member without attaching or detaching the heating roller unit, and wherein the second supporting member is configured to be slidably attachable and detachable from the front panel independent of the heating roller unit.

2. The supporting structure according to claim 1,
- wherein the front panel has an opening, and
- wherein the first supporting member and the second supporting member are disposed between the front panel and the rear panel through the opening.

3. The supporting structure according to claim 1,
- wherein the rear panel has a first positioning pin by which a rear end of the first supporting member and a rear end of the second supporting member are positioned, and
- wherein the front panel has a second positioning pin by which a front end of the first supporting member and a front end of the second supporting member are positioned.

4. A supporting structure for a temperature sensor, the supporting structure comprising:
- a front panel;
- a rear panel;
- a first supporting member having both ends in a longer-side direction of the first supporting member, the both ends removably supported by the front panel and the rear panel; and
- a second supporting member attachable to and detachable from the first supporting member, the temperature sensor disposed on the second supporting member, the temperature sensor configured to detect a surface temperature of a heating roller disposed between the front panel and the rear panel,
- wherein the second supporting member has a cover covering the temperature sensor,
- wherein the second supporting member has an air duct through which cooling air is supplied to the cover, and
- wherein the air duct is removably coupled to the second supporting member from through the rear panel.

5. The supporting structure according to claim 4, further comprising
- a pair of temperature sensors including the temperature sensor,
- wherein the pair of temperature sensors are disposed at both ends of the second supporting member in a longer-side direction of the second supporting member, and
- wherein the second supporting member has a flow-rate adjusting orifice configured to adjust a flow rate of the cooling air in a middle of the second supporting member in the longer-side direction.

6. The supporting structure according to claim 5, further comprising
- a pair of flow-rate adjusting orifices including the flow-rate adjusting orifice,
- wherein the pair of flow-rate adjusting orifices are disposed at an upstream portion and a downstream portion of the second supporting member through which the cooling air flows, in the middle of the second supporting member in the longer-side direction.

7. The supporting structure according to claim 6
- wherein the cover has a through hole through which an outer circumferential surface of the heating roller is viewable through the pair of temperature sensors, and
- wherein the cooling air is exhausted through the through hole.

8. The supporting structure according to claim 7,
- wherein the first supporting member has a pair of rising portions at both ends in a shorter-side direction of the first supporting member,
- wherein the first supporting member is configured to align both ends of the second supporting member in a shorter-side direction of the second supporting member, and
- wherein each one of the pair of rising portions has a notch aligned with the through hole.

9. A drying device comprising
- a supporting structure for a temperature sensor, the supporting structure comprising:
  - a front panel;
  - a rear panel;
  - a first supporting member having both ends in a longer-side direction of the first supporting member, the both ends removably supported by the front panel and the rear panel; and
  - a second supporting member attachable to and detachable from the first supporting member, the temperature sensor disposed on the second supporting member, the temperature sensor configured to detect a surface temperature of a heating roller of a heating roller unit disposed between the front panel and the rear panel, wherein the second supporting member is configured to be attachable to and detachable from the first supporting member without attaching or detaching the heating roller unit, and wherein the second supporting member is configured to be slidably attachable and detachable from the front panel independent of the heating roller unit.

* * * * *